May 15, 1962     H. J. GREENBERG     3,034,809

UNIVERSAL BALL AND SOCKET JOINT

Filed Aug. 8, 1960

INVENTOR.
HAROLD J. GREENBERG

BY Kane, Dalsimer and Kane

ATTORNEYS 3,034,809
Patented May 15, 1962

1

3,034,809
UNIVERSAL BALL AND SOCKET JOINT
Harold Jay Greenberg, 5 Cail Drive,
East Rockaway, N.Y.
Filed Aug. 8, 1960, Ser. No. 48,029
1 Claim. (Cl. 285—267)

The present invention relates to an improved ball and socket joint especially adapted for household lamps and the like and, more particularly, to an improved ball and socket type of joint that is adapted to provide universal movement, as well as limited rotational movement, between the ball and socket member.

An object of this invention is to provide a universal ball and socket joint capable of limited, relative rotational movement and which, at the same time, is simple and economical in construction, as well as easily assembled and installed.

Another object is to provide, for household lamps and the like, a universal ball and socket joint having a passage extending longitudinally therethrough for an electric conductor wire and having means for presenting limited, relative rotation and tilting of the ball within the socket without concern over the danger of undue twisting of the wire and its connections, which joint can be easily and rapidly assembled and installed such that it may be conveniently interposed between an electric light receptacle and a support for such receptacle without exposing any electric wires.

Numerous other objects and advantages will become apparent from the following detailed description and accompanying drawings which disclose a single, practical embodiment of this invention, and in which.

Figure 1:
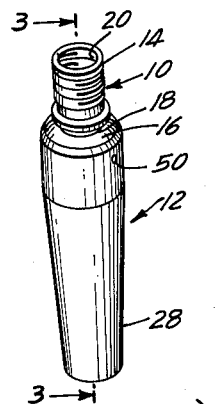
FIG. 1 is a perspective view of an assembled ball and socket joint fabricated in accordance with the present invention.

The universal ball and socket joint of this invention, capable of limited, relative rotational movement of its parts, comprises a ball forming part 10 and a socket forming part 12 with each having a longitudinally extending passage for accommodating an electric conductor wire required for most household lamps and the like.

The ball forming part 10 includes a threaded stem or stud 14 at one end thereof, while at the other end an enlarged substantially spherical portion or ball 16 is advantageously located. Interposed between the threaded stem 14 and the ball 16 is a throat 18 suitably formed for purposes of facilitating the desired universal movement of the ball forming part 10 with respect to the socket forming part 12. A longitudinally extending bore or passage 20 is additionally provided and is adapted to conveniently receive therethrough an electric conductor wire (not shown). If desired, a zone 22 of the passage 20 adjacent the base of the ball 16 may be flared or tapered outwardly for purposes of minimizing sharp-edge contact and friction which may detrimentally affect the embraced conductor wire, especially when the ball forming part 10 is swivelly rocked within its socket forming part 12. A transversely and circumferentially extending slot or recess 24 is provided in the outer face of the ball 16; and for purposes that will become apparent shortly, the slot 24 is interrupted by a stop 26, which is in the form an integral part of the ball 16 projecting across the width of the slot.

Referring now to the socket forming part 12, it will be realized that a substantially cylindrical member 28 serves

Figure 2:
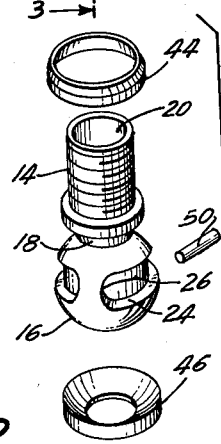
FIG. 2 is an exploded perspective view of the joint illustrated in FIG. 1.
Figure 2:
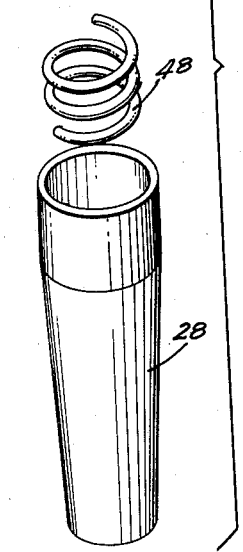
Figure 3:
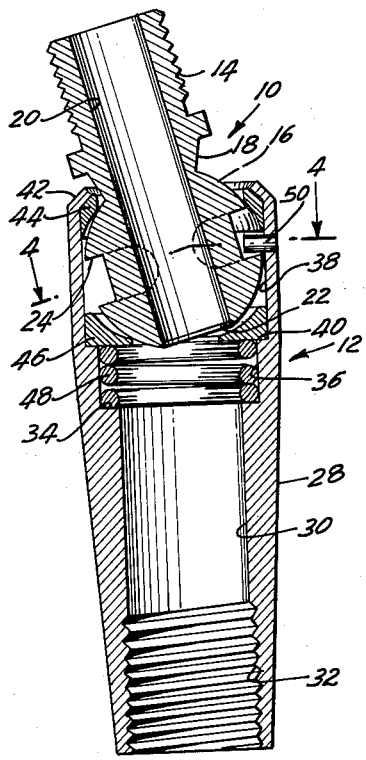
FIG. 3 is a longitudinal sectional view taken along the line 3—3 of FIG. 1.
Figure 4:
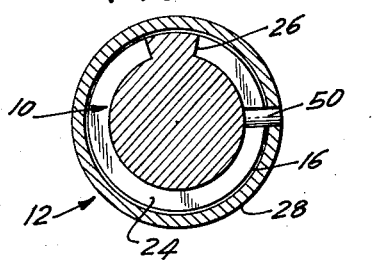
FIG. 4 is a cross-sectional view taken along the line 4—4 of FIG. 3.

2 to conveniently interconnect the joint parts. In this connection, an axially bore 30 is formed with internal threads 32 at the base of the cylindrical member 28 for meshing with complementary externally threaded portions of a household lamp or the like. This bore 30 forms a shoulder 34 with a somewhat enlarged coaxial bore 36, which, in turn, cooperates still larger bore 38 at the top of the cylindrical member 28 in presenting shoulder 40. Initially, the top of the cylindrical member 28 is in an unworked condition, as shown in FIG. 2. To secure the assembled parts, this end is subsequently swaged radially inwardly to assume the configuration illustrated in FIGS. 1 and 3. Thus, the swaged end 42 cooperates with shoulder 40 in embracing annular washers 44 and 46, respectively, having arcuate faces serving to properly seat the ball 16 within the socket forming part 12. In order that one must apply a deliberate force or pressure upon the ball forming part 10, to obtain a universal type movement or the aforementioned desired rotational movement, a tensioning means is provided for increasing the frictional forces between the ball 16 and the arcuate faces of the annular washers 44 and 46. This is facilitated by a coiled wire helical compression spring 48, which is neatly disposed in bore 36 and biased at one end thereof against shoulder 34 and at its other end against washer 46. As illustrated, the diameter of the internal bore of the washer 46 is preferably equal to or greater than the diameter of the outer peripheral portion of the outwardly tapered zone 22 formed in the ball 16 and slightly smaller than the inner diameter of spring 48. The swaged end 42 similarly cooperates with the washer 44 to provide an opening of sufficient diameter to thereby provide clearance for the throat 18, so that the stem 14 is able to flex in a substantially complete orbit. In this connection, it should be understood that the swivel or universal movement of the ball forming part 10 is limited only insofar as ultimate engagement is reached between the throat 18 of the ball forming part 10 and the inner annular periphery of the washer 44.

As is well known to those skilled in the art, when a universal ball and socket joint is incorporated in a household lamp or similar structure, there is a serious likelihood of undue twisting of an electrical conductor wire passed through the passages of the herein disclosed joint. Consequently, the wire may be severed or malfunctioning of its electrical connections may ensue, especially those connections adjacent the socket or receptacle for the light bulb normally associated with household lamps. This undesirable twisting of the electrical conductor wire and the severance of electrical connections is pronounced when the ball forming part and socket forming part are permitted unrestrained relative rotational movement about the major joint axis. Therefore, to prevent this undesirable twisting, but at the same time provide for some relative rotation of the ball forming part 10 with respect to the socket forming part 12, in order that a lamp shade, for example, may be oriented with respect to the base of the associated household lamp, a stop pin 50 is securely mounted in a suitably formed bore in cylindrical member 28 for purposes of being rotated within the confines of the slot 24 in the ball 16 of the ball forming part 10 of the joint under consideration. Accordingly, the ball forming part 10 will not be permitted to traverse more than a 360° arc with respect to its embracing socket forming part 12, because of the eventual engagement of the stop pin 50 with the stop 26, thereby insuring against undesirable twisting and severing of electrical conducting wire and connections. In this connection, it should be understood that the stop pin 50 does not engage the faces of the ball defining the slot 24 other than those of the stop 26 contributing to the means which provides for less than 360° permissible relative rotational displacement between the ball forming part 10 and socket forming part 12. Under such circumstances, the relative dimensioning of the diameter of the stop pin 50 and the width of the slot 24, as well as its depth, should be such that these parts do not engage or interfere with one another when the ball forming part 10 traverses the desired swivel motion. However, the pin 50 should ultimately engage the stop 26 on the ball 16 as a safeguard in preventing undesirable twisting of electrical wires without detrimentally affecting the desirable universal movement of the ball and socket joint, while permitting limited rotational movement of the ball forming part 10 with respect to the socket forming part 12.

Thus, among others, the aforenoted objects and advantages are effectively attained. Although a single practical embodiment is illustrated and described, it is intended that the scope of the present invention be defined by the appended claim.

I claim:

A universal ball and socket joint comprising a ball forming part and a socket forming part, said ball forming part being disposed within said socket forming part, said ball forming part and said socket forming part having a substantially aligned longitudinal passage therein and said ball forming part and socket forming part having universal tilting and relative rotational movement with respect to one another, said ball forming part comprising a longitudinally extending stem, said stem being externally threaded, an enlarged ball, and a reduced throat intermediate said stem and said ball, said reduced throat being engageable with the surfaces of the socket forming part and constituting a limiting means for determining the degree of universal tilting movement between the ball forming part and the socket forming part, and the ball part having a slot extending transversely around the ball forming part and through an arc of slightly less than 360°, stop means presented by surfaces of said ball at the terminal end of said slot for providing a stop, a projecting element extending from the socket forming part into said slot, said projecting element cooperating to engage the stopping means for limiting relative rotational movement of the ball forming part and the socket forming part to an amount less than 360°, the socket forming part comprises a tubular shell member having one end thereof flanged inwardly and the other end threaded, an annular washer snugly embracing portions of the ball forming part and being disposed adjacent the flanged end of the tubular shell member, a second annular washer snugly embracing other portions of the ball forming part, an annular shoulder on said tubular shell member for engaging said second annular washer, a second annular shoulder on said tubular shell member, and a helically coiled spring biased against said second annular shoulder and said second annular washer for maintaining the socket forming part and ball forming part in frictional pressure engagement whereby the two parts are held by friction in their adjusted positions.

References Cited in the file of this patent
UNITED STATES PATENTS

| | | |
|---|---|---|
| 2,041,847 | Marchand | May 26, 1936 |
| 2,623,763 | Fauser | Dec. 30, 1952 |
| 2,670,228 | Pagliuso | Feb. 23, 1954 |